UNITED STATES PATENT OFFICE.

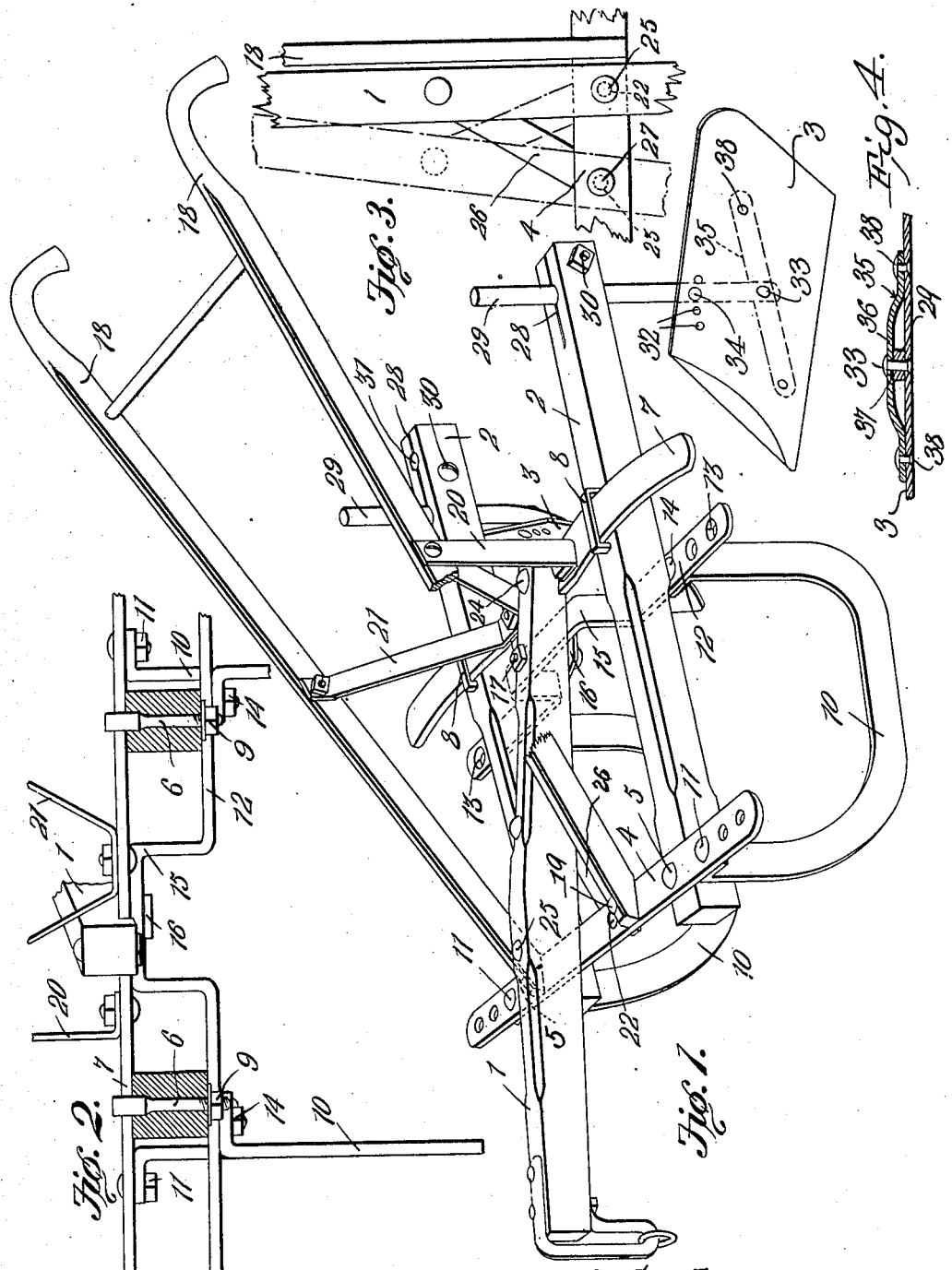

SPENCER B. CARTER, OF ELIZABETH CITY, NORTH CAROLINA.

PLOW.

No. 851,729.  Specification of Letters Patent.  Patented April 30, 1907.

Application filed June 19, 1906. Serial No. 322,486.

*To all whom it may concern:*

Be it known that I, SPENCER B. CARTER, a citizen of the United States, residing at Elizabeth City, in the county of Pasquotank and State of North Carolina, have invented a new and useful Plow, of which the following is a specification.

This invention relates to a plow designed to be used for scraping, hilling, and similar work, and it has for its principal object to provide a plow of simple and improved construction, which permits of a large variety of adjustments to be made with facility, so as to enlarge the field of usefulness of this class of devices.

With this object in view, and others, as will appear as the nature of the invention is better understood, the invention comprises the novel features of construction and arrangement of parts, hereinafter fully described and set forth with particularity in the claims appended hereto.

In the accompanying drawing, which illustrates one of the embodiments of the invention, Figure 1 is a perspective view of the plow. Fig. 2 is a transverse section of the plow taken adjacent the rear end of the draft beam thereof to show the means for adjusting the blade carrying beams and the runners. Fig. 3 is a detail plan view of the means for permitting the draft beam to be adjusted for operating the plow with one or two horses. Fig. 4 is a sectional view through one of the plow blades.

Corresponding parts in the several figures are indicated throughout by similar characters of reference.

Referring to the drawing, 1 designates the draft beam and 2 the side beams of a plow, the latter beams carrying at their rear ends the plow blades 3. The front ends of the side beams are connected and suitably spaced apart by a cross bar 4, the connections being effected by bolts 5 that serve as pivots on which the side beams are capable of a slight angular adjustment. At a point close to the middle of the side beams is a second cross bar 7 to the center of which the rear end of the center, or draft beam, 1 is bolted. On opposite sides of the center beam, the center cross bar 7 is bent on two arcs that are described respectively about the two bolts 5 on which the side beams have a slight angular adjustment. The beams are guided and adjusted along the curved portions of the center cross bar 7 by means of eye bolts 8 whose shanks extend vertically through the side beams and carry nuts 9 that serve to draw the eyes of the bolts so as to clamp the beams and center cross bar firmly together.

The ends of the front cross bar 4 project beyond the side beams and they are provided with a plurality of perforations by which the front ends of the runners 10 may be connected to the front cross bar at different distances apart, the apertures serving to receive the bolts 11. The rear ends of the runners are attached to a longitudinally movable bar 12 extending transversely under the side beam. The ends of this bar 12 are also provided with a plurality of apertures 13 for receiving the bolts 14 by which the rear ends of the runners can be adjusted so as to preserve parallelism between the runners. The central part of the under cross bar 12 is arched, as indicated at 15, so as to bear on the bottom of the draft beam 1, the bar being supported by means of a plate 16. The plate 16 is held in place on the center beam by the bolt 17, and it preferably takes the form of a spring for yieldingly clamping the under bar 12 against the center beam, while at the same time permitting of the under bar being laterally adjusted with respect to the center beam. It will thus be seen that the runners are supported independently of the side beams 2 and are capable of pivoting on their front ends simultaneously, the under cross bar 12 serving to maintain the parallelism between them.

The handles 18 for guiding the movement of the plow are secured at their front ends to the front cross bar 4, one of the handles being secured by one of the bolts 5 and the other by the bolt 19. The handles are secured in fixed position by the braces 20 and 21 that are bolted to the center cross bar 7 so that the handles, front and center cross bars 4 and 7, and center beam 1 form a rigidly constructed frame for carrying the simultaneously adjustable runners and independently adjustable blade carrying beams.

The center beam 1 is adapted to be adjustably connected with the front cross bar so as to occupy a central position or an angular position, in order to effect the proper draft when the plow is drawn with one or two horses. For this purpose, the cross beam 4 is provided with a central aperture, indicated at 22, and a second aperture, indicated at 23, located in an arc described about the bolt 24 attaching the rear end of the center beam to the cross bar 7. Extending through the center beam is a bolt 25 which is adapted to enter either one of the openings 22 or 23 to secure the draft beam in either a central or angular position, as shown respectively by dotted and full lines in Fig. 3. When in either position, the beam is braced by the link 26 bolted at one end to the beam and at the opposite end to the bar 4 by a bolt 27 extending through one or the other of the openings 22 or 23 depending upon the set of the center beam.

The rear ends of the side beams are slit in a vertical plane, as indicated at 28 to form clamping jaws for holding the upper ends of the sheths 29, the latter passing through vertical perforations lying in the plane of the slits. This arrangement permits of the sheths being adjusted vertically or angularly so as to vary the depth of penetration of the blades or their angular set with respect to the line of travel. The sheths are clamped in position by the bolts 30, or equivalent devices. The rear end of one of the side beams is slit inwardly to a greater distance than the slit in the other and is provided with two or more perforations 31, so as to permit one blade to be set in advance of the other, or both opposite each other, as desired, according to the work to be done. The blades may be rigidly attached to the sheths, in which case different sets of blades would be required for scraping, hilling and other operations. I prefer, however, to employ a construction whereby the blades may be adjustable on the sheths. For this purpose, each blade 3 is pivoted to the lower end of its respective sheth by means of the pivot 33, and at a suitable distance therefrom are several spaced apertures 32 arranged in an arc struck from the pivot for receiving a bolt or equivalent device 34, which bolt passes through an eye in the sheth and prevents the blade from turning on its pivot. By this means the blade can be adjusted so that its lower edge will be horizontal for adapting the plow for scraping, or will be at an angle to the horizontal for adapting the plow for hilling.

By preference the blades 3 are made of sheet metal of such a thickness as to enable the blades to maintain their sharpness, thereby doing away with the necessity of taking the blades to a smith from time to time for sharpening or drawing out, as is required with blades in common use. In order to add rigidity to the blades each is provided with a brace 35 arranged on the back side of the blade in an approximately diagonal line. As shown in Fig. 4 the brace is arched or bowed rearwardly at its middle portion 36 so as to be spaced apart from the rear surface of the blade to receive between it and the latter the lower end of the sheth. At the middle of the arched portion 36 is an aperture 37 for receiving the rivets 33, and the ends of the brace are rigidly secured to the blade by rivets 38. This construction considerably strengthens the blade so that it can pass over stumps, stones, roots, etc. with less liability of being damaged, and furthermore, the blade is securely attached to its sheth so that it cannot be easily torn loose.

From the foregoing description, taken in connection with the accompanying drawing, the various advantages of the construction and methods of adjustment and operation will be readily appreciated by those skilled in the art to which the invention appertains.

I have described the principle of operation of the invention, together with the apparatus which I now consider to be the best embodiment thereof, but I desire to have it understood that the apparatus shown is merely illustrative, and that various changes may be resorted to, when desired, as are within the scope of the invention.

What is claimed is:—

1. A plow comprising a frame, a plurality of runners, pivots connecting the front ends of the runners with the frame, and means independent of the frame and connected with the rear ends of the runners for holding the latter a fixed distance apart.

2. A plow comprising a frame, a plurality of runners connected at their front ends with the frame, a slidable bar guided on the frame, and means for connecting the rear ends of the runners to the said bar.

3. A plow consisting of a draft beam, a blade carrying beam pivotally mounted with respect thereto, and a runner adjustable laterally and pivotally with respect to the draft beam and independently of the blade carrying beam.

4. A plow comprising a draft beam, two independently adjustable blade carrying beams disposed on opposite sides thereof, a transversely extending member to which the beams are attached, a plurality of runners having laterally extending apertured ends, bolts for adjustably connecting the front apertured ends of the runners to the said member, a second transverse member having apertured ends, and bolts adjustably connecting the rear ends of the runners to the apertured ends of the second member.

5. A plow comprising a frame, pivotally mounted blade carrying beams, runners disposed in front of the latter and adjustably connected at their front ends on the frame, a transverse bar movably mounted on the frame, a resilient member on the frame arranged in frictional engagement with the bar, and means for adjustably connecting the rear ends of the runner to the bar.

6. A plow comprising a frame composed of two transverse bars and a draft beam rigidly connected thereto, plow carrying beams pivoted at their front ends on the frame, runners pivoted at their front ends on the frame and adjustably connected therewith, and a member which is transversely movable with respect to the frame for supporting the rear ends of the runners.

7. A plow comprising a frame, a plurality of parallel runners, pivots on the front end of the frame for connecting the front ends of the runners to the latter and adjustable toward or away from each other to vary the distance between the runners, a bar rigidly and adjustably connected with the rear ends of the runners to hold the latter a fixed distance apart and to permit the runners to swing simultaneously on their pivots, and means for supporting the bar on the frame for movement thereon.

8. A plow comprising a frame composed of two spaced transverse bars and a draft beam rigidly connected thereto, blade carrying beams pivoted at their front ends to one of the bars, means for independently adjusting the latter beams to move the rear ends thereof toward or away from each other, a plurality of runners which are adjustable toward or from each other, and a member guided by the frame for permitting the runners to be moved simultaneously.

9. A plow comprising a front cross bar, a cross bar located at the rear thereof and having arc-shaped portions, blade carrying beams pivoted to the front cross bar at the centers of the arc-shaped portion of the rear bar, eye bolts on the beams which adjustably engage the said arc-shaped portions, a plurality of runners pivotally mounted on the front bar, and a member connected with the ends of the runners opposite from the pivots thereof for connecting the runners together and holding them a fixed distance apart.

10. A plow comprising a front cross bar having a plurality of perforations at its ends, a cross bar located at the rear thereof having arc-shaped portions, blade carrying beams pivoted to the front cross bar at the centers of the said arc-shaped portions, means for adjustably connecting the beams to said portions, a third cross bar having perforations in its ends, runners, and devices engaging in the said perforations for adjustably connecting the runners to the last mentioned bar and front bar.

11. A plow comprising a draft beam, a plurality of blade carrying beams, a plurality of runners pivoted at their front ends in fixed relation to the draft beam, a cross bar to which the rear ends of the runners are attached, and means for movably supporting the bar on the draft beam.

12. A plow comprising two spaced transverse bars, a draft beam, means for adjusting the beam on the bars blade carrying beams connected with the bars, handles connected with one of the transverse bars, and braces between the other transverse bar and the handles.

13. A plow comprising two spaced transverse bars, a draft beam rigidly and adjustably connected thereto, a plurality of blade carrying beams adjustably connected to the bars, runners adjustable with respect to the bars, and handles connected with the bars independently of the beams.

In testimony that I claim the foregoing as my own, I have hereto affixed my signature in the presence of two witnesses.

SPENCER B. CARTER.

Witnesses:
J. C. SPENCE,
J. T. SPENCE.